United States Patent [19]
Inoue et al.

[11] 3,927,436
[45] Dec. 23, 1975

[54] MULTIPLE-SHAFT DOUBLE-MOTION DRIVE MECHANISM

[75] Inventors: Naohiko Inoue; Youichi Moori, both of Yokohama, Japan

[73] Assignees: Nissan Motor Co., Ltd., Jidosha Denki Kogyo Kabushika Kaisha, both of Yokohama, Japan

[22] Filed: Feb. 15, 1974

[21] Appl. No.: 442,824

[30] Foreign Application Priority Data
Feb. 19, 1973 Japan............................ 48-19209

[52] U.S. Cl. ......... 15/250.17; 15/250.22; 15/250 A; 318/DIG. 2; 318/443; 74/665 F
[51] Int. Cl.² ...... B60S 1/08; B60S 1/20; B60S 1/44
[58] Field of Search ....... 15/250.16, 250.17, 250.12, 15/250.22, 250.3; 318/443, DIG. 2; 74/665 F

[56] References Cited
UNITED STATES PATENTS

| | | | |
|---|---|---|---|
| 2,268,253 | 12/1941 | Hill et al. | 15/250.22 X |
| 2,604,652 | 7/1952 | Poindexter | 15/250.16 |
| 3,649,990 | 3/1972 | Saito | 15/250.22 |
| 3,736,617 | 6/1973 | Ahlen | 15/250.22 |
| 3,877,104 | 4/1975 | Martin | 15/250 A |

FOREIGN PATENTS OR APPLICATIONS
676,967  12/1963  Canada............................ 15/250 A

*Primary Examiner*—Peter Feldman

[57] ABSTRACT

A multiple-shaft double-motion drive mechanism which comprises a reversible motor having an output shaft rotatable in opposite directions, a first gear rotatable with the output shaft of the motor, a second gear in mesh with the first gear, first and second shafts to be respectively and separately driven by the first and second gears, a first one-way clutch connected between the first gear and the first shaft for transmitting the rotation of the motor output shaft to the first shaft when the output shaft is rotated in one direction, and a second one-way clutch connected between the second gear and the second shaft for transmitting the rotation of the motor output shaft when the output shaft is rotated in the other direction, wherein the first shaft may be drivingly connected to translatory means adapted to convert the rotary motion of the first shaft into a linear reciprocating motion whereas the second shaft may be drivingly connected to means adapted to deliver rotary motions. Examples of applications of the drive mechanism include an automatically-operated wiper assembly of a lamp of a lighting device such as a head lamp of an automotive vehicle.

8 Claims, 5 Drawing Figures

MULTIPLE-SHAFT DOUBLE-MOTION DRIVE MECHANISM

The present invention relates to multiple-shaft double-motion drive mechanisms and, more particularly, to a multiple-shaft drive mechanism which has a condition to produce a reciprocating motion and a condition to produce a rotary motion from a single power input.

A known multiple-shaft double-motion drive mechanism has output shafts which are selectively driven by a single drive source through a square-jaw clutch or a friction clutch. The square-jaw or friction clutch is coupled and uncoupled by means of a mechanical or hydraulic control arrangement which is designed to be specifically compatible with the device to be finally driven. An object of the present invention is to provide an improved multiple-shaft double-motion drive mechanism which is capable of producing two kinds of motions such as reciprocating and rotary motions from a single power input without use of the mechanical or hydraulic control arrangement. It is another object of the present invention to provide an improved multiple-shaft double-motion drive mechanism which is compatible, without substantial modification, with practically any types of devices to be driven in dual motions. It is still another object of the present invention to provide an improved multiple-shaft double-motion drive mechanism which is simple in construction and economical to manufacture.

In accordance with the present invention, these and other object will be accomplished in a multiple-shaft double-motion drive mechanism which comprises in combination a reversible motor having an output shaft which is rotatable in first and second directions, a first gear rotatable with the output shaft of the motor, a second gear which is in mesh with the first gear, first power output means to be driven by the first gear, second power output means to be driven by the second gear, a first one-way clutch connected between the first gear and the first power output means for transmitting to the first power output means the rotation of the output shaft of the motor in the first direction, and a second one-way clutch connected between the second gear and the second power output means for transmitting to the second power output means the rotation of the output shaft of the motor in the second direction. More specifically, the first output means may comprise a first shaft connected to the first gear through the first one-way clutch for being rotated about its axis by the first gear when the output shaft of the motor is rotated in the first direction and translatory means driven by the first shaft for converting the rotational motion of the first gear into a reciprocating motion, whereas the second output means may comprise a second shaft connected to the second gear through the second one-way clutch for being rotated about its axis by the second gear when the output shaft of the motor is rotated in the second direction, a third gear formed on the second shaft and at least one fourth gear in mesh with the third gear for delivering a power output from the second power output means. The translatory means forming part of the first power output means may comprise a worm formed on the first shaft, a worm wheel which is in mesh with the worm, a pin fixed to one face of the worm wheel and radially spaced apart from an axis of rotation of the worm wheel for being rotated about the axis when the worm wheel is rotated, and an elongated guide member which is movable in a direction parallel to a certain diametrical direction of the worm wheel and in which the pin on the worm wheel is received movably in a longitudinal direction of the guide member whereby the guide member is moved back and forth in the aforesaid direction parallel to the diametrical direction of the worm wheel as the pin is rotated about the axis of the worm wheel and moved back and forth in the longitudinal direction of the guide member.

While the multiple-shaft double-motion drive mechanism of the nature above described will find a wide variety of practical applications for its versatility and simple construction, such a mechanism will prove advantageous where used for the driving of an automatically operated wiper assembly for a head lamp of a power-driven vehicle such as an automotive vehicle. It is, therefore, still another object of the present invention ot provide a useful combination of such a wiper assembly and the improved multiple-shaft double-motion drive mechanism.

The wiper assembly of this nature comprises a wiper arm pivotally movable over the lamp between an operative position having its leading end located substantially over the center of the lamp and an inoperative position away from the lamp, a blade carrying arm carrying thereon a wiper blade and connected to the wiper arm rotatably about the leading end of the wiper arm, a first flexible line connected at one end to the first power output means of the drive mechanism and at the other end to the wiper arm for moving the wiper arm between the operative and inoperative positions thereof as the first power output means are driven from the motor through the first gear and the first one-way clutch, and a second flexible line which is connected at one end to the second power output means of the drive mechanism and at the other end to the blade carrying arm for driving the blade carrying arm to turn about the leading end of the wiper arm as the second power output means are driven from the motor through the second gear and the second one-way clutch.

The natures of the multiple-shaft double-motion drive mechanism and the combination of such a mechanism and the wiper blade assembly according to the present invention will become more apparent from the following detailed description taken in conjunction with the accompanying drawings in which.

Figure 1:
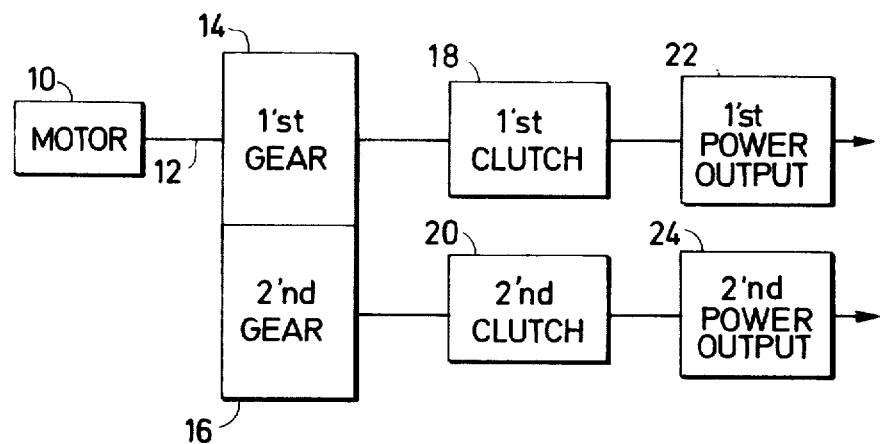
FIG. 1 is a view which schematically shows in a block form a fundamental arrangement which is generic to an embodiment of the multiple-shaft double-motion drive mechanism according to the present invention.
Figure 2:
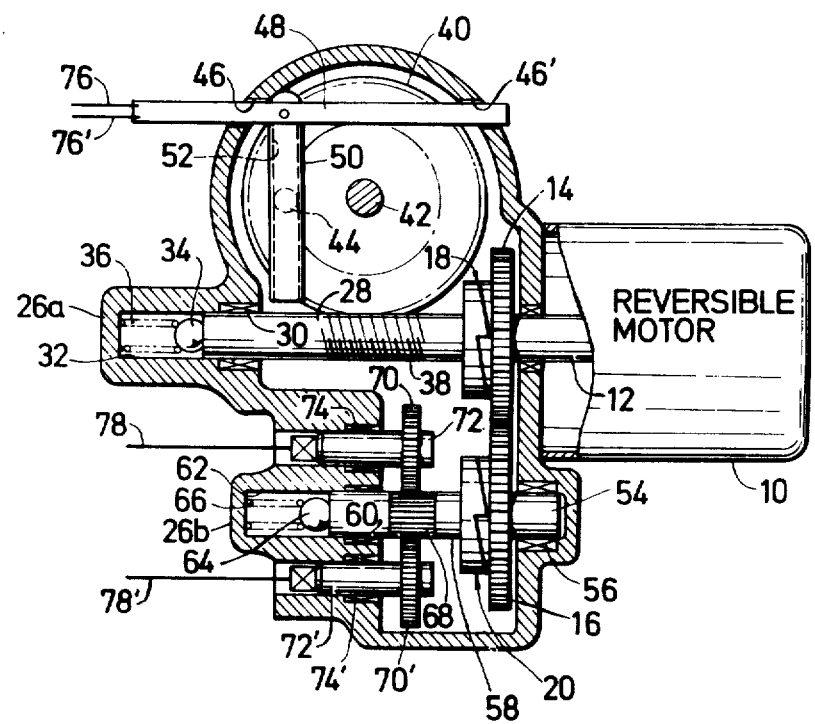
FIG. 2 is a sectional view which shows partly in a side elevation a preferred embodiment of the multiple-shaft double-motion drive mechanism realizing the generic arrangement illustrated in FIG. 1.

Reference will now be made to the drawings, first to FIG. 1. The multiple-shaft double-motion drive mechanism according to the present invention comprises in essence a reversible motor 10 having an output shaft 12 which is rotatable in opposite directions depending upon the polarity of the electric power applied to the motor. The directions of rotation of the output shaft 12 are herein referred to as first and second directions. To the output shaft 12 of the reversible motor 10 is connected a first gear 14 which is in constant mesh with a second gear 16. When the motor 10 is energized to have the output shaft 12 rotated in one direction, the first gear 14 is rotated in the same direction as the direction of rotation of the output shaft 12 while the second gear 16 is rotated in an opposite direction to the direction of rotation of the output shaft 12. The first and second gears 14 and 16 are connected through first and second one-way clutches 18 and 20 to first and second power output means 22 and 24, respectively. The first and second one-way clutches 18 and 20 are adapted to be coupled when the respectively associated gears 14 and 16 are rotate in the same direction as the direction of rotation of the output shaft 12 of the motor 10 and uncoupled when the gears 14 and 16 are rotated in the opposite direction to the direction of rotation of the output shaft 12 of the motor 10. For brevity of description, it is herein assumed that the first one-way clutch 14 is coupled and concurrently the second one-way clutch 16 is uncoupled when the output shaft 12 of the motor 10 is rotated in the previously mentioned first direction and that the first one-way clutch 14 is uncoupled and concurrently the second one-way clutch 16 is coupled when the output shaft 12 of the motor 10 is rotated in the previously mentioned second direction. Thus, the first power output means 22 are driven from the motor 10 through the first gear 14 and the first one-way clutch 16 and at the same time the second power output means 24 remain at rest when the output shaft 12 of the motor 10 is rotated in the first direction and, conversely, the first power output means 22 remains at rest and at the same time the second power output means 24 are driven from the motor 10 through the first and second gears 14 and 16 and the second one-way clutch 20 when the output shaft 12 of the motor 10 is rotated in the second direction. A power output is thus delivered from either of the first and second power output means 22 and 24 depending upon the direction of rotation of the output shaft 12 of the motor 10, viz., upon the polarity of the electric power supplied to the motor 10. The fundamental arrangement above described may be realized into a practical form in the construction illustrated in FIG. 2. The one-way clutches 18 and 20 incorporated in the drive mechanism shown in FIG. 2 are preferably the sprag type one-way clutches which are usually used in combination with torque converters of automotive power transmission systems. The spring type clutch is largely composed of concentric and radially spaced inner and outer coupling elements and a number of sprags located between the coupling elements and are in rolling engagement with outer and inner peripheral surfaces of the innr and outer coupling elements, respectively, though not shown in the drawings.

Referring to FIG. 2, the gears, clutches and power output means are all housed in a casing 26 through which the output shaft 12 of the reversbile motor 10 projects for connection to the first gear 14. The first power output means comprise a shaft 28 connected to the first gear 14 through the first one-way clutch 22 and aligned with the output shaft 12 of the motor 10. The shaft 28 is supported in a bearing 30 on the casing 26.

The casing 26 has formed in its portion adjacent to the leading end of the shaft 28 a bore 32 in which a ball member 34 and a preload spring 36 are accommodated. The ball member 34 is in contact with the leading end of the shaft 28 and the preload spring 36 is seated at one end on the ball member 34 and at the other on an inner face of a closed wall portion 26a forming part of the casing 26 so that the shaft 28 is urged by the action of the preload spring 36 away from the closed wall portion 26a and accordingly the first one-way clutch 22 is biased into a coupled condition. The shaft 28 has a longitudinally intermediate portion threaded to form a worm 38. The worm 38 is in constant mesh with a worm wheel 40 which is rotatable on and about a shaft 42 extending at right angles to the shaft 28 and journaled to the casing 26. The worm wheel 40 carries a pin 44 projecting perpendicularly from one face of the worm wheel and radially spaced apart from the shaft 42, as indicated by a broken line in FIG. 2. The casing 26 has formed in its portion surrounding the worm wheel 40 apertures 46 and 46' which are aligned in a direction perpendicular to the shaft 42 carrying the worm wheel 40. A slider member 48 is longitudinally slidable through these apertures in a direction parallel to the plane of rotation of the worm wheel 40 and has its end portions projecting out of the casing 26 as shown. The slider member 48 carries at its longitudinally intermediate portion an elongated guide member 50 which is connected at right angles to the slider member 48. The guide member 50 has a generally U-shaped cross section (not seen in the drawing) forming an elongated groove 52 throughout its length and slidably received in the elongated groove 52 the pin 44 mounted on the worm wheel 40. The pin 44 on the worm wheel 40 is thus movable longitudinally in the elongated groove 52 in the guide member 44 as it is rotated about the shaft 42 by the turning of the worm wheel 40. As the pin 44 is thus moved back and forth longitudinally in the elongated groove 52 in the guide member 50, the guide member 50 is moved back and forth in a direction perpendicular to its length so that the slider member 48 is also moved back and forth in its longitudinal direction through the aligned apertures 46 and 46' in the casing 26. The translatory means made up of the worm shaft 38, the worm wheel 40, the pin 44 and the elongated guide member 48 are thus adapted to convert the rotary motion of the shaft 28 into a reciprocating linear motion of the slider member 48. The length of th strokes of the slider member 48 is apparently dictated by the turning radius of the pin 44 about the shaft 42.

The second gear 16, on the other hand, is carried on a shaft 54 which is supported in a bearing 56 on the casing 26 and is rotated with the shaft 54 in an opposite direction to the first gear 14. The gear 16 is connected through the second one-way clutch 20 to the second power output means which comprise a shaft 58 aligned with the shaft 56 and supported in a bearing 60 on the casing 26. The casing 26 has formed in its portion adjacent to the leading end of the shaft 58 a bore 62 in which a ball member 64 and a preload spring 66 are accommodated. The ball member 64 is in contact with the leading end of the shaft 58 and the preload spring 66 is seated at one end on the ball member 64 and at the other end on a closed wall portion 26b forming part of the casing 26. The shaft 58 is thus urged by the preload spring 66 away from the closed wall portion 26b and accordingly the second one-way clutch 20 is biased into a coupled condition. The shaft 58 is formed with or securely carried thereon a gear 68 which is in constant mesh with gears 70 and 70'. The gears 70 an 70' are carried on and rotatable with shafts 72 and 72' which are journaled on the casing 26 through bearings 74 and 74', respectively. The gears 70 and 70' are herein shown as two in number but the number of the gears to mesh with the gear 68 on the shaft 58 may be selected depending upon the number of members to be driven by the second power output means. The second power output means are thus adapted to power outputs which are in the form of rotary motions of the shafts 72 and 72'.

The reciprocating linear motion of the slider member 48 of the first power output means is transmitted to driven members through, for example, flexible lines 76 and 76' whereas the rotary motions of the shafts 72 and 72' of the second power output means are transmitted to driven members through, for example, flexible lines 78 and 78', respectively. The flexible lines are actually wires or cables which are flexible in their longitudinal directions and which are rigid against twisting forces that may be applied thereto.

The operation of the multiple-shaft double-motion drive mechanism thus constructed will now be described.

When the reversible electric motor 10 is energized to have its output shaft 12 rotated in the first direction previously mentioned, the first gear 18 is driven to rotate in the same direction as the output shaft 12 so that the first one-way clutch 18 is held in a coupled condition causing the shaft 28 to rotate with the gear 14. The worm wheel 40 is therefrom driven to rotate about the shaft 42 by the worm shaft 38 so that the guide member 50 is moved back and forth in a direction parallel to the shaft 28 by means of the pin 44 which is rotated about the shaft 28 by means of the pin 44 which is rotated about the shaft 42 together with the worm wheel 40 and accordingly moved back and forth in the elongated groove 52 in the guide member 50 in the longitudinal direction of the guide member 50. This causes the slider member 48 to move back and forth in its longitudinal direction through the aligned apertures 46 and 46' in the casing 26. In the meantime, the second gear 16 is driven by the first gear 14 and is rotated in the opposite direction to the direction of rotation of the output shaft 12 of the motor 10. The second one-way clutch 20 is therefore held in an uncoupled condition so that the shaft 58 carrying the gear 68 is maintained at rest and accordingly the shafts 72 and 72' carrying the gears 70 and 70', respectively, are inoperative to deliver power outputs.

When, the direction of rotation of the output shaft 12 of the reversible motor 10 is reversed, viz., changed into the previously mentioned second direction, then the first one-way clutch 18 is uncoupled and concurrently the second one-way clutch 20 is brought into a coupled condition so that the shaft 28 is maintained at rest whereas the shaft 58 carrying the gear 68 is driven to rotate with the second gear 16. Power outputs in the form of rotational movements are thus delivered from the shafts 72 and 72' carrying the gears 70 and 70'.

Either reciprocating or rotational motion is thus produced by the drive mechanism shown in FIG. 2 depending upon the direction of rotation of the output shaft 12 of the reversible motor. The direction of rotation of the output shaft 12 is changed usually by changing the polarity of the electric power supplied to the motor 10 by the use of an electric control circuit which may be designed to control the motor 10 in predetermined schedules.

The flexible lines 76 connected to the slider member 48 of the first power output means and the flexible lines 78 and 78' connected to the shafts 72 and 72', respectively, of the second power output means may be connected to any device having members to be driven by means of reciprocating motions and members to be driven by means of rotary motions. An example of such a device is, as previously mentioned, an automatically operated wiper assembly for use with a head lamp of an automotive vehicle.

Figure 3:
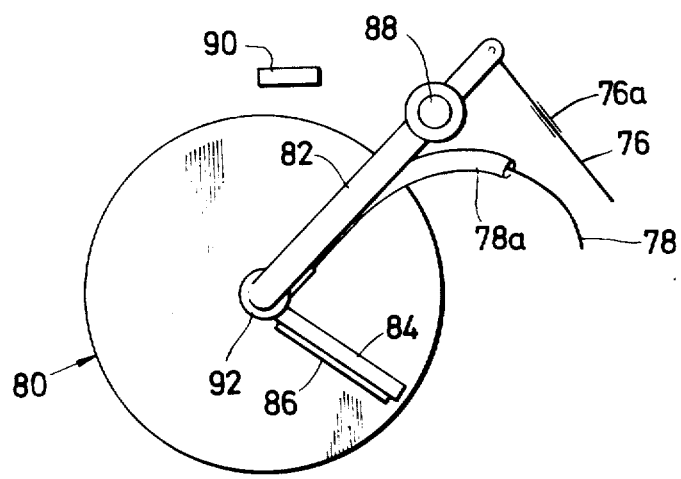
FIG. 3 is a plan view of an automatically operated wiper assembly which may be combined with the drive mechanism illustrated in FIG. 2.
Figure 4:
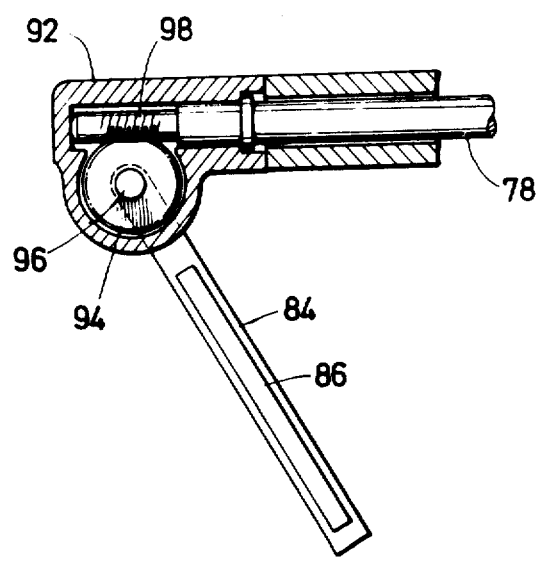
FIG. 4 is a sectional view showing part of the wiper assembly of FIG. 3.

Referring to FIG. 3, the automatically operated wiper assembly is intended to wipe off a head lamp 80 of an automotive vehicle and comprises a wiper arm 82 and a blade carrying arm 84 carrying a wiper blades 86 along its length. The wiper arm 82 is pivotally mounted on a vehicle body (not shown) through a pivotal pin 88 and is rotatable about the pivotal pin 88 over the head lamp 80 between a first or operative position having its leading end located substantially over the center of the lamp 80 and a second or inoperative position away from the lamp 80. Designated by reference numeral 90 is a stop member which is positioned to limit the angular movement of the wiper arm 82 to the second or inoperative position thereof. The blade carrying arm 84 is connected to the leading end of the wiper arm 82 in a manner to be rotatable about the leading end of the wiper arm 82 through a gear housing 92 incorporating a worm and worm-wheel arrangement the details of which are illustrated in FIG. 4. Referring to FIG. 4, the blade carrying arm 84 is securely connected at one end to a worm wheel 94 which is rotatable on a shaft 96 supported on the housing 92. The worm wheel 94 is in mesh with a worm shaft 98 which is connected to the leading end of the flexible line 78 from the second power output means of the drive mechanism shown in FIG. 2. The worm shaft 98 is thus rotated about its axis when the flexible line 78 is twisted about its longitudinal axis by means of the shaft 74 of the second power output means of the drive mechanism. Turning back to FIG. 3, the wiper arm 82 is connected at its outer end to the leading end of the flexible line 76 from the slider member 48 of the first power output means of the drive mechanism shown in FIG. 2. Designated by reference numerals 76a and 78a are metal sleeves for the flexible lines 76 and 78, respectively.

The operation of the wiper assembly thus combined with the drive mechanism shown in FIG. 2 will now be described with concurrent reference to FIGS. 2, 3 and 4.

When the reversible motor 10 is energized so that the output shaft 12 thereof is rotated in the previously mentioned first direction, the slider member 48 of the first power output means is driven to reciprocate while the shafts 72 and 72' of the second power output means are held at rest. The flexible line 76 connected to the slider member 48 is accordingly moved back and forth along its longitudinal axis so that the wiper arm 82 of the wiper assembly is caused to turn about the pivotal pin 88 and pass over the head lamp 80. When the wiper arm 82 is moved to the operative position having its leading end located over the center of the lamp 80, then the motor 10 is actuated to have its output shaft 12 rotated in the reversed or second direction so that the slider member 48 and accordingly the wiper arm 82 are held at rest and instead the shaft 72 of the second power output means of the drive mechanism is driven to rotate about its axis. The flexible line 78 is thus rotated about its longitudinal axis by the shaft 72 so that the worm shaft 98 in the housing 92 of the wiper assembly is driven to drive the worm wheel 94 to rotate about the shaft 96 on the housing 92, causing the blade carrying arm 84 to rotate about the shaft 92, viz., about the center of the lamp 80 because the leading end of the wiper arm 82 is located over the center of the lamp 80. The lamp 80 is thus wiped by the wiper blade 86 on the blade carrying arm 84. When the wiping of the lamp 80 is complete and at an instant the blade carrying arm 84 is in alignment with the wiper arm 82, then the motor 10 is for a second time energized so that the output shaft 12 thereof is rotated in the first direction. The rotation of the blade carrying arm 84 about the leading end of the wiper arm 82 is accordingly stopped and, in turn, the wiper arm 82 is driven to rotate about the pivotal pin 88. When the wiper arm 82 is thus moved back to its inoperative position in contact with the stop member 90, then the motor 10 is de-energized so that the drive mechanism shown in FIG. 2 and the wiper assembly shown in FIG. 3 are brought to full stops.

Figure 5:
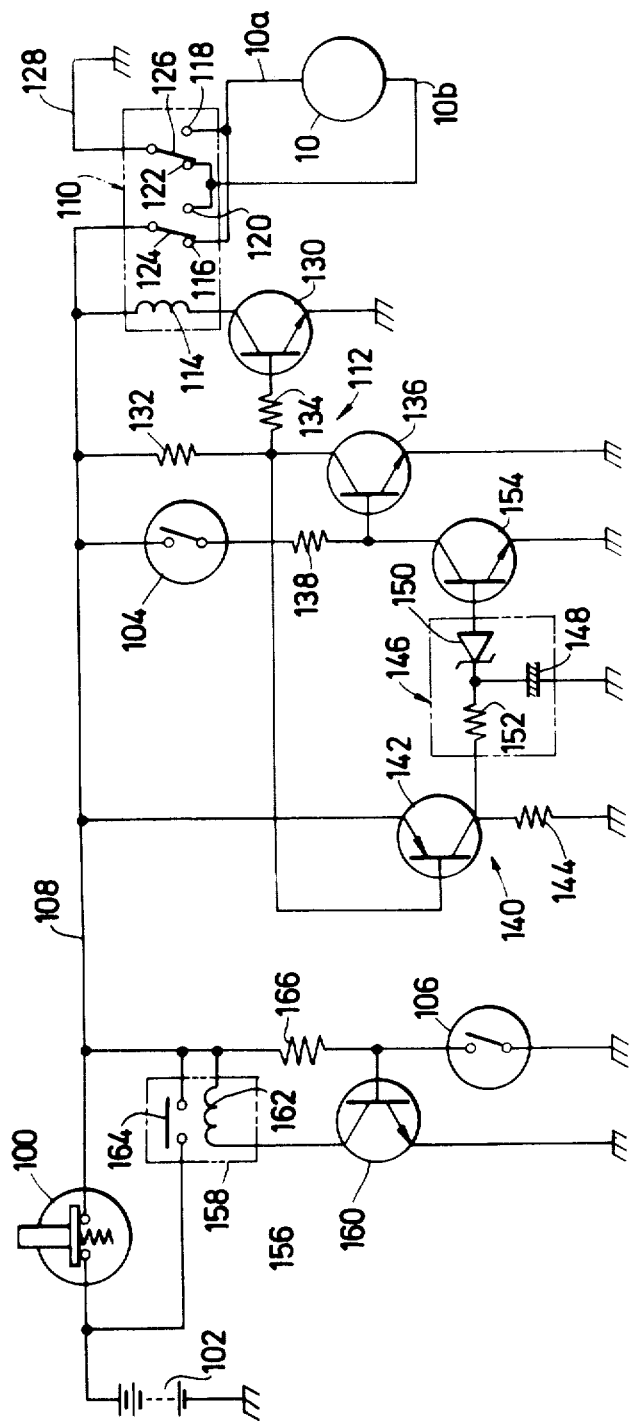
FIG. 5 is a diagram which shows a preferred example of an electric control circuit to control the drive mechanism according to the present invention when the drive mechanism is combined with the wiper assembly illustrated in FIG. 3.

To achieve the above described operation of the wiper assembly, the reversible motor 10 is controlled in a timed fashion by means of a suitable sequence control circuit, a preferred example of which is illustrated in FIG. 5.

The control circuit illustrated in FIG. 5 comprises in essence a manually-operated switch 10 which is adapted to connect the control circuit to a power source 102 when manually closed, a center-position responsive switch 102 adapted to be closed responsive to positioning of the wiper arm to the operative position having its leading end located at the center of the lamp, a stop-position responsive switch 104 adapted to be closed responsive to positioning of the wiper arm away from the lamp, polarity inverting means for energizing the reversible motor 10 with a current of a first polarity responsive to closing of the manually-operated switch 100 and with a current of a second polarity responsive to closing of the center-position responsive switch 104, the output shaft of the motor being rotated in the first direction when the motor is energized with the current of the first polarity and in the second direction when the motor is energized with the current of the second polarity and timing means which are adapted to be actuated responsive to the closing of the center-position responsive switch 104 and operative to produce an output at a predetermined time interval after the timing means are actuated for causing the polarity inverting means to energize the motor 10 with the current having the first polarity so that the output shaft of the motor 10 is rotated in the first direction at the predetermined time interval after the center-position responsive switch 104 is closed. The manually-operated switch 100 is connected between the power source 102 and a bus line 108 while the center-position responsive switch 104 and the stop-position responsive switch 106 are connected between the bus line 108 and ground.

The polarity-inverting means may consist of a relay 110 and a relay control circuit 112. The relay 110 comprises a coil 114 which is connected at one end to the bus line 108, first and second stationary contacts 116 and 118 connected to one terminal 10a of the motor 10, third and fourth stationary contacts 120 and 122 connected to the other terminal 10b of the motor 10, a first movable contact 124 movable between the first and third stationary contacts 116 and 120 and connected to the bus line 108, and a second movable contact 126 movable between the second and fourth stationary contacts 118 and 122 and connected to ground through a line 128. The first and second movable contacts 124 and 126 are adapted to be connected to the first and fourth stationary contacts 116 and 122 when the coil 114 is energized and to the second and third stationary contacts 118 and 120 when the coil 114 is de-energized. When, thus, the coil 114 is energized from the power source 102 through the bus line 108, the terminal 10a of the motor 10 is connected to the bus line 108 through the first stationary contact 116 and the first movable contact 124 and at the same time the terminal 10b of the motor 10 is grounded through the fourth stationary contact 122 and the second movable contact 126. When, conversely, the coil 114 remains de-energized, then the terminal 10a of the motor 10 is grounded through the second stationary contact 118 and the second movable contact 126 while the terminal 10b of the motor 10 is connected to the bus line 108 through the third stationary contact 120 and the first movable contact 124. It is, in this instance, assumed that the output shaft of the motor 10 is rotated in the previously mentioned first direction when the bus line 108 is connected to the terminal 10a of the motor 10 and in the previously mentioned second direction when the bus line 108 is connected to the terminal 10b of the motor 10. The first and second polarities as previously mentioned in connection with the current to be supplied to the motor 10 should therefore be construed as being the positive and negative polarities, respectively, produced at the terminal 10a of the motor 10.

The relay control circuit 112 comprises an n-p-n transistor 130 having a base connected through resistors 132 and 134 to the bus line 108, a collector electrode connected to the coil 114 of the relay 110, and an emitter electrode which is grounded, an an n-p-n transistor 136 having a base connected to the bus line 108 through a resistor 138 and over the center-position responsive switch 104, a collector electrode connected through the resistor 134 to the base of the transistor 130, and an emitter electrode which is grounded. As will be understood from the description to follow, the transistor 130 is adapted to energize the coil 114 of the relay 110 when the manually-operated switch 100 is closed whereas the transistor 136 is adapted to make the transistor 130 non-conducting and accordingly de-energize the coil 114 in response to the closing of the center-position responsive switch 104. The transistor 136 is made non-conducting and accordingly the transistor 130 is made conducting by the action of the timing means which are now designated by reference numeral 140.

The timing means 140 comprise a p-n-p transistor 142 which has a base connected to the collector electrode of the transistor 136 of the relay control circuit 112, an emitter electrode connected to the bus line 108 and a collector electrode which is grounded through a resistor 144. The collector electrode of the transistor 142 is further connected through a delay circuit 146 to an n-p-n transistor 148. The delay circuit 146 is adapted to produce an output in a predetermined time period after it has been energized and such a time period is prescribed in a manner to enable the wiper assembly of FIG. 3 to completely wipe the lamp after the wiper arm has been brought into the operative position over the lamp. The delay circuit 146 comprises a parallel combination of a capacitor 148 and a voltage regulator diode such as a Zener diode 150. One electrode of the capacitor 148 is connected through a resistor 152 to the collector electrode of the transistor 142 and the other electrode thereof is grounded. The Zener diode 150 has a cathode terminal connected through the resistor 152 to the collector electrode of the transistor 142. The timing means 140 further comprise an n-p-n transistor 154 which has a base connected to an anode terminal of the Zener diode 150, a collector electrode connected to the base of the transistor 136 and through the resistor 138 to the bus line 108 across the center-position responsive switch 104, and an emitter electrode connected to ground.

To maintain the control circuit energized continuously even though the manually-operated switch 100 may open after it has once been closed, the control circuit may further include a self-holding circuit 156 which is shown as comprising a combination of a relay 162 and an n-p-n transistor 160. The relay 162 has a coil 162 and a set of normally-open contacts 164 which are connected across the manually-operated switch 100. The transistor 160 has a base connected through a resistor 166 to the bus line 108 and across the stop-position responsive switch 106 to ground, a collector electrode connected through the coil 162 of the relay 158 to the bus line 108, and an emitter electrode which is grounded.

The operation of the control circuit thus constructed and arranged will now be described in brief.

The manually-operated switch 100 and the center-position responsive switch 104 are normally open whereas the stop-position responsive switch 106 is normally kept closed.

When the manually-operated switch 100 is closed so as to initiate into action the wiper assembly shown in FIG. 3, the bus line 108 is connected to the positive terminal of the power source 102 so that a voltage is impressed on the base of the transistor 160 of the self-holding circuit 156. The transistor 160 is thus made conducting and accordingly the coil 162 of the relay 158 becomes energized from the power source 102, causing the normally-open contacts 164 of the relay 158 to close. The closed condition of the relay 158 is maintained even though the manually-operated switch 100 may become open unless the stop-position switch 106 is kept closed. The bus line 108 is thus kept connected to the power source 102 through the relay 158 even though the switch 100 may be open.

The bus line 108 being energized from the power source 102, the transistor 130 becomes conducting so that the coil 114 of the relay 110 is energized. Under these conditions, the center-position responsive switch 104 remains open and as a consequence the transistor 136 is kept non-conducting in the absence of a voltage at the base thereof. When the coil 114 of the relay 110 is energized from the power source 102, the first and second movable contacts 124 and 126 are moved to be connected to the first and fourth stationary contacts 116 and 122, respectively, of the relay 110 with the result that the terminal 10a of the reversible motor 10 is connected to the positive terminal of the power source 102 through the bus line 108 whereas the terminal 10b of the motor 10 is connected to ground through the line 128. The motor 10 is thus operative to have its output shaft rotated in the previously mentioned first direction so that the wiper arm 82 of the wiper assembly shown in FIG. 3 is moved from the inoperative position toward the operative position over the lamp 80. When the wiper arm 82 thus reaches the operative position having its leading end located over the center of the lamp 80, the center-position responsive switch 104 closes so that the transistor 136 is made conducting.

When the transistor 136 thus becomes conducting, the potential on the base of the transistor 130 decreases so that the transistor 130 becomes non-conducting and accordingly the coil 114 of the relay 110 is de-energized. The first and second movable contacts 124 and 126 of the relay 110 are consequently allowed to be connected to the second and third stationary contacts 118 and 120, respectively, so that the terminal 10a of the motor 10 is connected to ground through the line 128 whereas the terminal 10b of the motor 10 is connected to the power source 102 through the bus line 108. The output shaft of the motor 10 is therefore rotated in the previously defined second direction so that the wiper arm 82 of the wiper assembly shown in FIG. 3 is held at rest and instead the blade carrying arm 84, of the assembly is driven to turn about the center of the lamp 80 and wipe the lamp.

The conduction of the transistor 136 brings about reduction of the potential on the base of the p-n-p transistor 142 of the timing means 140. The transistor 142 is therefore made conducting so that the capacitor 148 is charged through the resistor 152. When the capacitor 148 is fully charged and the voltage across the Zener diode 150 rises beyond the breakdown voltage (Zener voltage) thereof, a current flows through the Zener diode 150 to the base of the transistor 154, which is consequently made conducting. This results in a decrease in the potential on the base of the transistor 136, causing the transistor 136 to turn off. The potential on the collector electrode of the transistor 136 thus increases and accordingly a current flows through the resistor 134 to the base of the transistor 130. The transistor 130 is thus made conducting for a second time so that the first and second movable contacts 124 and 126 of the relay 110 are connected to the first and fourth stationary contacts 116 and 122, thereby causing the motor 10 to have its output shaft rotated in the previously defined first direction. The wiper arm 82 of the wiper assembly shown in FIG. 3 is therefore moved back from the operative position to the inoperative position away from the lamp 80 and strikes against the stop member 90. The stop-position responsive switch 106 thus opens responsive to the inoperative position of the wiper arm 82. This results in a decrease in the potential on the base of the transistor 160 of the self-holding circuit 156. The transistor 160 is thus made non-conducting so that the coil 162 of the relay 158 is de-energized. The normally-open contacts 164 of the relay 158 thus restores the open condition. If, under these conditions, the manually-operated switch 100 remains closed, the above described operation of the control circuit will be repeated but, if the switch 100 is open, then the bus line 108 is disconnected from the power source 102 so that the motor 10 remains at rest.

The circuit arrangement above described is merely illustrative of a preferred example of the control means to sequentially control the combination of the drive mechanism shown in FIG. 2 and the wiper assembly shown in FIG. 3 and, as such, various other examples of such control means may be possible to achieve substantially the same results as those achieved by the shown circuit arrangement. While, moreover, the drive mechanism according to the present invention has thus far been described as being combined with the automatically-operated wiper assembly for the head lamp of an automotive vehicle, the drive mechanism herein disclosed may be used in combination with any other devices which are to be driven by dual motions. Although, furthermore, the wiper assembly combined with the drive mechanism has been assumed to be used on the head lamp of an automotive vehicle, such is merely by way of example and thus the wiper assembly may be used in conjunction with any lighting or other optical devices.

What is claimed is:

1. A combination of a double-motion drive mechanism and a wiper assembly for a lamp of a lighting device, in which said drive mechanism comprises a reversible motor having an output shaft rotatable in first and second directions depending upon the polarity of a current energizing the motor, a first gear rotatable with the output shaft of the motor, a second gear in mesh with the first gear, first power output means to be driven by said first gear for producing a power output in the form of a linear reciprocating motion, second power output means to be driven by said second gear for producing a power output in the form of a rotary motion, a first one-way clutch connected between said first gear and said first power output means for transmitting to the first power output means the rotation of the output shaft of the motor in said first direction, and a second one-way clutch connected between said second gear and said second power output means for transmitting to the second power output means the rotation of the output shaft of the motor in said second direction and in which said wiper assembly comprises a wiper arm pivotally movable over said lamp between an operative position having its leading end located substantially over a center of the lamp and an inoperative position away from the lamp, a blade carrying arm carrying thereon a wiper arm and connected at one end to said wiper arm and rotatable about said leading end of the wiper arm, a first flexible line connected at one end to said first power output means of the drive mechanism and at the other end to said wiper arm for moving the wiper arm between said operative and inoperative positions as said first power output means produces said linear reciprocating motion, and a second flexible line which is connected at one end to said second power output means of the drive mechanism and at the other end to said blade carrying arm for driving the blade carrying arm to rotate about said leading end of the wiper arm as said second power output means produce said rotary motion.

2. A combination as claimed in claim 1, in which said first power output means of the drive mechanism comprise a first shaft connected to said first gear through said first one-way clutch for being rotated about its axis when the output shaft of said motor is rotated in said first direction and translatory means driven by said first shaft for converting the rotational motion of the first shaft into said linear reciprocating motion and in which said second power output means of the drive mechanism comprise a second shaft connected to said second gear through said second one-way clutch for being rotated about its axis when the output shaft of the motor is rotated in said second direction, a third gear formed on said second shaft, and at least one fourth gear in mesh with said third gear for delivering said rotary motion when said second shaft is driven from said motor.

3. A combination as claimed in claim 2, in which said translatory means comprise a worm formed on said first shaft, a worm wheel which is in mesh with said worm, a pin fixed on one face of the worm wheel and radially spaced apart from an axis of rotation of the worm wheel for being rotated about said axis when the worm wheel is driven to rotate by said worm, and an elongated guide member which is movable in a direction parallel with a certain diametrical direction of the worm wheel and in which said pin on the worm wheel is received movably in a longitudinal direction of the guide member whereby the guide member is moved back and forth in said direction parallel to said certain diametrical direction of the worm wheel as the pin is rotated about said axis and moved back and forth in the longitudinal direction of the guide member.

4. A combination as claimed in claim 3, in which said guide member is connected to said first flexible line and said fourth gear is connected to said second flexible line.

5. A combination as claimed in claim 1, in which said drive mechanism further comprises first biasing means for urging said first one-way clutch into a coupled condition and second biasing means for urging said second one-way clutch into a coupled condition.

6. A combination as claimed in claim 5, in which said wiper assembly further comprises a worm shaft rotatable about its axis and connected to said second flexible line for being rotates about the axis thereof when the second flexible line is twisted about a longitudinal axis thereof, and a worm wheel in mesh with said worm shaft and connected to said blade carrying arm for driving the blade carrying arm to rotate about said leading end of the wiper arm when driven by said worm shaft.

7. A combination as claimed in claim 1, further comprising a control circuit which comprises a manually-operated switch for connecting the control circuit to a power source when closed, a center-position responsive switch to be closed responsive to positioning of said wiper arm in said operative position thereof, a stop-position responsive switch to be closed responsive to positioning of the wiper arm in said inoperative position thereof, polarity inverting means for energizing said reversible motor with a current of a first polarity responsive to closing of said manually-operated switch and with a current of a second polarity responsive to closing of said center-position responsive switch, the output shaft of the motor being rotated in said first direction when energized with the current having said first polarity and in said second direction when energized with the current having said second polarity, said motor being de-energized responsive to closing of said stop-position responsive switch, and timing means to be actuated responsive to the closing of said center-position responsive switch and operative to produce an output at a predetermined time interval after the timing means are actuated for causing said polarity inverting means to energize said motor with the current having said first polarity so that the output shaft of the motor is rotated in said first direction at said predetermined time interval after said center-position responsive switch is closed.

8. A combination as claimed in claim 7, in which said control circuit further comprises a self-holding circuit for maintaining the control circuit energized when said manually-operated switch is open and said stop-position responsive switch is closed.

* * * * *